Patented May 22, 1934

1,959,958

UNITED STATES PATENT OFFICE 1,959,958

ORGANIC ARSENIC OR ANTIMONY SELENO COMPOUND

Morris S. Kharasch, Chicago, Ill.

No Drawing. Original application August 14, 1926, Serial No. 129,291. Divided and this application March 3, 1932, Serial No. 596,669

4 Claims. (Cl. 260—14)

The present invention relates to the production of water soluble organo-metal compounds of arsenic or antimony and selenium.

This application is a division of my copending application, Serial No. 129,291 which was filed on August 14, 1926, now Patent No. 1,858,958.

The invention is of particular importance in connection with the organic compounds having germicidal or therapeutic value, such as compounds of mercury, arsenic, bismuth, antimony and the like, the efficiency of which has hitherto been greatly limited by the difficulty of producing water soluble compounds.

In carrying out the process of my invention, I react upon an organo-metallic compound with a water or an alkali soluble compound containing the selenyl group (—SeH), of which H—SeRAc represents a typical formula, in which RAc is an aliphatic or aromatic radical containing an acid group and of which seleno-salicylic acid

is a simple example. I may, however, use instead of selenyl, compounds containing a carboxyl group, or groups, other compounds as the occasion may demand, such as the sulfonic acid derivatives of the selenyl compounds, i. e., selenyl G acid.

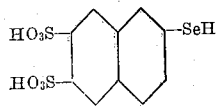

or any other substituted selenyl acids.

A typical formula for the organo-metallic compounds reacted upon is as follows:

R—Hg—X in which R is any organic radical having the Hg attached to a carbon atom and in which X is any replaceable inorganic radical or group. It is to be noted that elements of the sulfur family, that is (sulfur, selenium, tellurium) are not completely replaceable and are not suitable as the group in the above formula. Hg is here representative of any metal having a valence greater than one which will form organo-metallic compounds with the metal bonded to a carbon atom and which compounds are stable toward water, for example, metals such as As, Sb, Bi, Au, etc.

The proper choice of the selenyl derivative depends only upon the toxicity of the selenyl compound itself, and whether an extremely soluble preparation is desired. Naturally, in the case of extremely water-insoluble metallic preparations it is necessary to use a selenyl derivative containing more than one acid group. The fundamental reaction, however, is the same in all cases, i. e., the union of the metal with the selenium, forming a metallo-organic acid whose alkali metal salts are water soluble; e. g.;

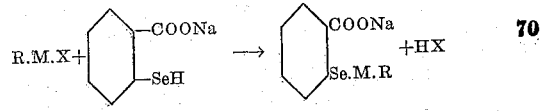

The following examples and methods of procedure merely illustrate my invention but by no means limit it:

As a specific illustration, the invention may be carried out as follows: To 2.6 grams of ethyl mercuric chloride ($C_2H_5.Hg.Cl$) suspended in 10 cc. of alcohol, eight-tenths of a gram of sodium hydroxide, dissolved in a small amount of water, is added. The mixture is shaken and treated with 1.9 grams of selenosalicylic acid, dissolved in 5 cc. of alcohol. The following reaction takes place:

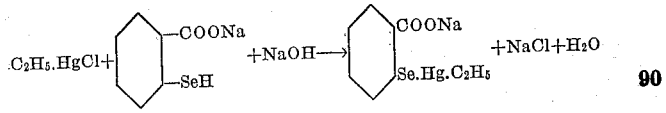

By employing in a similar way selenoglycollic acid, using monomolecular equivalents, the sodium salt of ethyl-mercuroselenoglycollic acid is produced.

To eliminate the alcohol and make the preparation available for intravenous injection, the solution, as obtained above, is diluted with 100 cc. of water, filtered, if necessary, and treated with a dilute solution of hydrochloric or sulfuric acid. The following reaction then takes place:

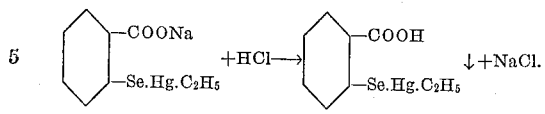

The ethyl mercury selenosalicylic acid is collected on a filter, washed well with water, to remove the alcohol and salts. The well washed precipitate may then be suspended in water and treated with just enough sodium hydroxide to form the sodium salt of the carboxylic acid, i. e.,

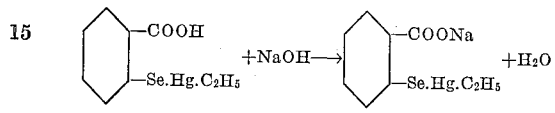

or sodium bicarbonate may be used. In any case, the mercurial is in water solution now and immediately available for injection. Other alkaline compounds capable of forming soluble salts with the preparation made may be employed, particularly bases of the alkali metals. The sodium compounds are, however, preferred.

A similar procedure was employed for the preparation of water soluble preparations of butyl mercuric chloride, isoamyl mercuric chloride, cyclohexyl mercuric chloride, phenyl mercuric chloride and o-nitraniline p-mercuric chloride.

It is evident also that the alcohol does not play any part in the reaction, except that inasmuch as the mercurials are more soluble in it than in water, in which their solubility is practically nil, it merely accelerates the reaction between the mercurial and the selenyl compound. The same final product, however, is obtained irrespective of the media employed. Thus acetone may in some cases be advantageously substituted for alcohol.

Equivalent reactions may be utilized for the production of other water soluble mercuri-organic compounds, or water soluble preparations, of other metals, such as arsenic and antimony and others that form stable organo metallic compounds toward water.

In the case of the arsenic and antimony compounds, the method is of particular value in making available for therapeutic use the organo metallic derivatives of trivalent arsenic and antimony, which are insoluble, except in very strong alkali, which renders their solutions useless for injection purposes, due to the very high alkalinity.

The following examples and methods merely illustrate my invention in the case of organo metallic derivatives of trivalent arsenic and trivalent antimony, but by no means limit it.

To an alcoholic solution of 2.1 grams of p-dimethyl amino phenyl arsenous oxide, a few drops of hydrochloric acid are added and then 3.8 grams of selenosalicylic acid, dissolved in 50 cc. of alcohol. The whole is shaken for ten minutes, and then diluted with a large volume of water. The product of the reaction precipitates.

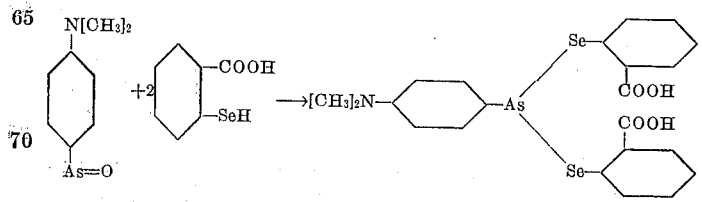

It is washed well with water. It is then suspended in water and brought into solution either by the addition of the calculated amount or by the addition of sodium bicarbonate or sodium hydroxide. In either case a water solution of the organic arsenous oxide compound is immediately available for injection work.

The same final product may also be obtained by treating a water suspension of the p-dimethyl arsenous oxide with selenosalicylic acid in the presence of the calculated amount of sodium hydroxide or a slight excess of sodium bicarbonate. By similar reactions the corresponding compound of selenosalicylic acid and acetanilide para arsenous oxide may be prepared.

Similar results were obtained with acetanilide p-arsenous oxide.

The organic antimony compounds of trivalent antimony behave toward selenosalicylic acid similarly, in almost all respects, to those of trivalent arsenic. Thus, by reactions similar to that just set forth, the selenosalicyclic acid derivatives of dimethylaniline para antimonous oxide have been prepared.

I claim as my invention:

1. A water soluble salt of the following general formula:

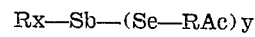

in which R is a non-heterocyclic group forming compounds stable toward water with antimony, RAc is a non-heterocyclic organic radical containing an acid group forming compounds stable toward water with selenium, the Sb and Se atoms being bonded to carbon atoms of the R and RAc groups, respectively, and in which $x+y=3$ and $y=1$ or 2.

2. A water soluble salt of

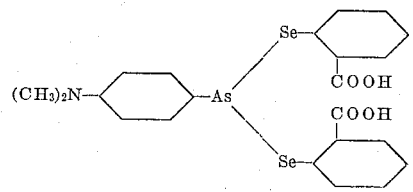

3. A water soluble salt of

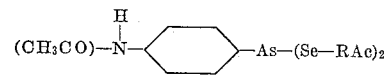

in which RAc is an organic radical containing an acid group.

4. A compound containing a metal of the class consisting of antimony and arsenic, a non-heterocyclic organic radical having a carbon atom joined to such metal by one valence bond of the metal, a selenium atom joined by one bond to another valence bond of said metal, and an organic radical containing an acid group, having a carbon atom joined to the other valence bond of the selenium atom.

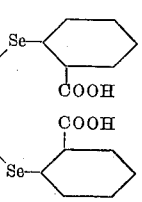

MORRIS S. KHARASCH.